No. 891,455.
PATENTED JUNE 23, 1908.
G. L. BENNETT.
HOT WATER HEATER.
APPLICATION FILED APR. 4, 1907.
2 SHEETS—SHEET 2.
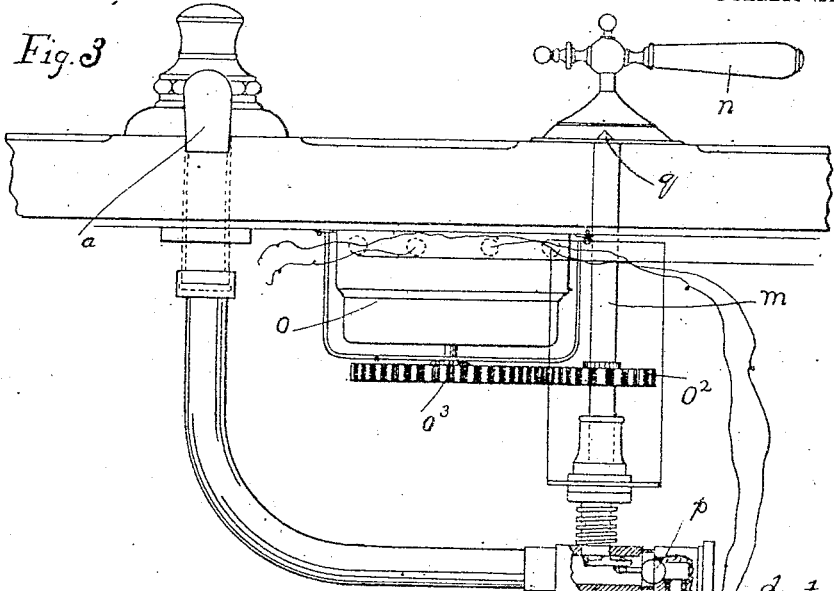
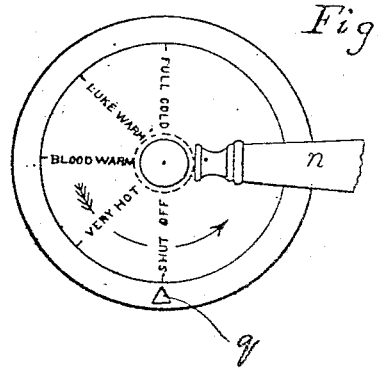
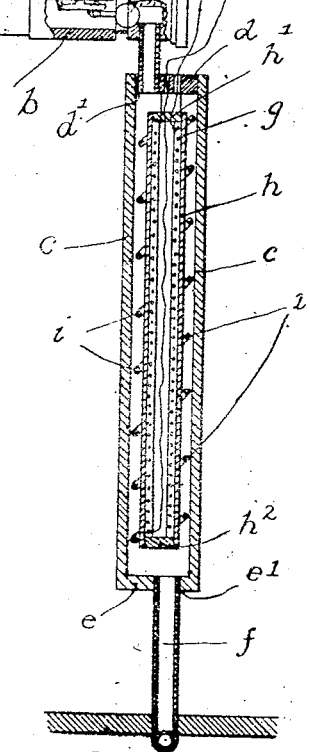
WITNESSES
INVENTOR
George L. Bennett
BY Frothingham & Wentworth
HIS ATTORNEYS

UNITED STATES PATENT OFFICE.

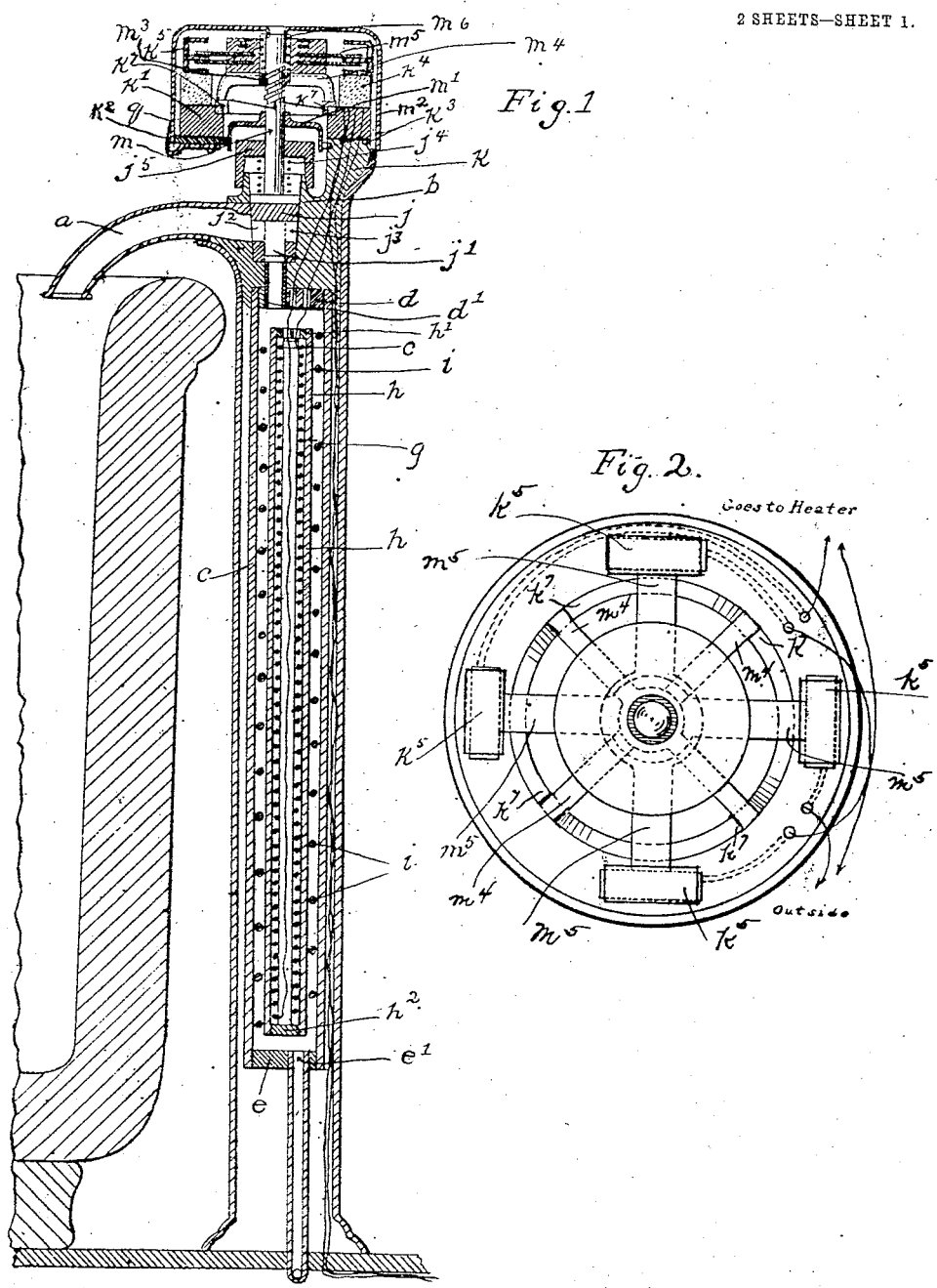

GEORGE L. BENNETT, OF TRENTON, NEW JERSEY.

HOT-WATER HEATER.

No. 891,455.

Specification of Letters Patent.

Patented June 23, 1908.

Application filed April 4, 1907. Serial No. 366,242.

*To all whom it may concern:*

Be it known that I, GEORGE L. BENNETT, a citizen of the United States, residing at Trenton, in the county of Mercer and State of New Jersey, have invented certain new and useful Improvements in Hot - Water Heaters, of which the following is a specification, reference being had therein to the accompanying drawings, which form a part thereof.

My invention relates to hot water heaters and more particularly to that class thereof adapted to heat flowing water.

The main object of the invention is to provide a hot-water heater, which may be readily applied to ordinary or service pipes in a neat and compact form so as to cause the water to pass therethrough prior to its discharge from the faucet.

A further object is to provide a substantially instantaneous heater wherein the temperature of the water may be regulated without varying the quantity of heat generated by the heater proper thus permitting the use of an electrical heater without employing a rheostat.

A still further object is to provide such a heater in conjunction with means controlling the flow of water and the development of heat, so as to permit the variance of the temperature of the water from the normal reservoir temperature to the maximum high temperature through the variance in the volume of water being discharged from the heater.

A still further object is to provide a heater embodying therein an electrical resistance device inclosed by a heating chamber in communication with the house or service pipes and with the faucet and a handle or knob actuating both a valve controlling the water flow and a switch controlling the electrical circuit, whereby the volume of the flow of water and the circuit to said resistance may be simultaneously controlled in such manner that by turning said handle or knob in successive stages, the electrical circuit will be open during the first stage; closed during the succeeding stages and open at the last or normal stage; and the water will be caused to flow in a diminishing volume from "full on" in the first stage to "full off" in the last stage.

A still further object is to provide an electrical heater wherein the circuit to the resistance will be cut off slightly in advance of the flow of water to prevent a residuum of heat within the heater proper.

A still further object is to provide an electrical heater wherein the conductor and switch mechanism will be so protected and insulated as to prevent the current following the water, and to conform to the general requirements of the regulations of fire underwriters as to electrical devices. And a still further object is to provide a heater of this character which embodies therein parts of general utility, thus reducing the cost of production or installation while preserving a simplicity of structure.

The invention consists primarily in the combination with a water faucet and a valve therefor, of a heater, a casing forming a channel adjacent thereto through which the water flows to said valve, a house or service pipe, discharging into said casing, means whereby said heater may be made operative or inoperative as desired, and connections between said means and said valve whereby the volume of water passing through said channel will be diminished when said heater is operative; and in such other novel features of construction and combination of parts as are hereinafter set forth and described and more particularly pointed out in the claims hereto appended.

Referring to the drawings: Figure 1 is a vertical section through a hot water heater embodying therein the preferred form of my invention; Fig. 2 is a plan view of the electrical switch with the cap removed; Fig. 3, is an elevation, partly in section of a modified form of the invention showing its application to a different type of fitting, and Fig. 4, is a plan view of the faucet handle.

Like letters refer to like parts throughout the several views.

In the embodiment of my invention shown in the accompanying drawings, there are certain features common to both forms of the invention, the structural differences being merely such as to adapt the invention to different types of valves. I will therefore, first describe these common features and then the details of each form of the invention shown.

My invention, broadly, contemplates a discharge faucet *a* communicating with the outlet of a valve casing *b* and a heating chamber within a cylinder *c*, in communication with said casing *b*. The said cylinder *c* has end plugs *d*, *e*, through which respectively are suitable openings $d'$, $e'$, to permit the water to flow to and from said chamber. The opening $e'$, is in communication with the ordinary house or service pipes, as $f$, so as to cause the water to be supplied to said chamber under ordinary reservoir pressure and at the normal reservoir temperatures.

Within the cylinder $c$, is a heating device $g$ preferably comprising an electrical resistance coil of any approved type properly insulated and inclosed in a tubular metallic jacket $h$. Said jacket has its ends inclosed by plugs $h'$ $h^2$. The dimensions of the jacket $h$ are such as to leave a small space between it and the cylinder $c$, so as to permit the water to pass in a more or less thin film over said jacket and to bring but a small quantity thereof within the influence of the resistance contained within said jacket. To increase the duration of the period to which the water passing through the cylinder is subjected to the heat, I preferably arrange a spiral partition $i$, within the space between the cylinder and the jacket thus forcing all water to pass around the jacket in a spiral course.

The terminals of the electrical resistance device are passed through the plugs $h'$ and $d$, and the openings in said plugs are so calked or plugged as to make the cylinder and the jacket water tight.

The flow of water through the heating chamber is controlled by a valve, the construction of which may vary as desired; but to permit the water flowing from the faucet to be discharged at different temperatures, I provide an electrical switch arranged in the circuit to the resistance which is controlled through the valve actuating means, thus controlling simultaneously the flow of the water, and that of the electrical current.

The detailed arrangement of the valve controlling means relative to the electrical switch will vary with the style of valve, or the style of switch, but the general arrangement will be such that the circuit will be broken at all times save that interval between the attainment of the full head of water and the complete cut off of the flow, thus permitting the regulation of the temperature of the water by the variation in the velocity of the flow of water through the heating chamber, or in the volume of water discharged therefrom.

In the form of the invention shown in Figs. 1 to 3, inclusive I have shown an ordinary valve casing $b$, having a conical seat. Mounted in this seat is a conical plug $j$, having an axial opening $j'$, therein, and two discharge ports $j^2$, and $j^3$, diametrically opposite to each other, each of which approximates 90 degrees in width. The plug $j$, is packed above and below said port in any desired manner, and is held in place by a spring $j^4$, seated between it and the gland $j^5$.

A bracket $k$, having a circular support $k'$ is carried by the water fixture in a position fixed relative to the casing $b$. Said support encircles the valve stem $m$, which is located substantially centrally, thereof. On the valve stem $m$ is fitted a cup $m'$ extending into close juxtaposition to the support $k'$. The support $k'$, carries a packing ring $k^2$, of felt or other desired material extending into engagement with the cup $m'$, so as to make the space within said support water tight. The stem $m$, has secured thereto a cap or casing $m^2$ entirely inclosing the bracket $k$ and support $k'$, and engaging the packing $k^2$, so as to prevent the entrance of water about said support.

Owing to the presence of the bracket $k$, the packing ring $k^2$, cannot be continuous so that to avoid the entrance of water about this bracket it is desirable to channel it and insert felt blocks $k^3$ therein so as to engage the cup $m'$, and the handle cap $m^2$. Said cap serves as a handle by means of which valve stem is turned.

The support $k'$, has four upwardly projected stops as $k^7$, 90 degrees apart, on the inner edge thereof, and also a circular block $k^4$, of micanite, vulcanite or other insulating material, carrying four electrical contacts $k^5$, also 90 degrees apart, those diametrically opposite each other being on the same horizontal plane but on a different plane from the remaining contacts.

The stem $m$ has a worm thereon, on which is seated a collar $m^3$, carrying the arms $m^4$, 180 degrees apart, which arms are adapted to engage the stops $k^7$. Encircling the stem $m$, and secured to said collar, is a combined torsion and expansion spring $m^6$, adapted to normally force said arms downward into engagement with said stops and to impart simultaneously a rapid rotary and a downward movement thereof when said arms are raised sufficiently to disengage said stops.

The collar $m^3$, also carries a plurality of electrical contacts $m^5$ disposed on different planes and adapted to bridge the space between the contact $k^5$, in the usual and well known manner.

The contacts are so positioned relative to the plug that the circuit will be closed substantially simultaneously with the full opening of the cock and will be opened just prior to the full closing thereof, thus permitting such a flow of water in the heater after the current is off, as to prevent the heating of water at times when no water is being drawn from the heating chamber.

The wiring shown in Fig. 2, is that ordinarily found in electrical switches of this type and will not therefore be described in detail.

In the modifications shown in Figs. 3 and 4 the valve construction is such as to require a movement of the stem of 180 degrees to open the valve to the full extent. This necessitates a construction whereby the electrical switch will be operated but twice during each full rotation of the stem, instead of four times as in the preferred form of the invention. In this modification I also employ an ordinary handle to the valve stem as $n$, and arrange an ordinary electrical switch beneath the basin slab or other device in connection with which the heater is employed. This switch which I have designated as $o$, possesses the essential characteristics of the switch heretofore described, its casing being, however, an ordinary switch housing. The operating stem of this switch carries a gear $o^3$, which is in a mesh with a pinion $o^2$, carried by the stem $m$, the diameter of which is one half of that of the gear $o'$. The construction and operation of the valve shown in this modification being immaterial to the invention will not be described in detail beyond the description already given, it being merely essential to understand that it requires a full half turn of the stem to operate this valve which is indicated at $p$.

In both forms of the invention I provide on some part of the fitting an indicator finger as $q$, and place graduations upon some part of the fitting carried by the valve stem, indicating the point of cut off, and stop points where the flow of water will be such in volume as to have its temperature at a predetermined point.

The operation of the preferred form of the invention is substantially as follows: Under normal conditions, water from the service pipes $f$, will be discharged into the cylindrical casing $c$, until the latter is filled. When this condition exists the contacts $m^5$, on the upper plane and those on the lower plane will be respectively above and below the contacts $k^5$, thus breaking the electrical circuit. If it be desired to secure cold water only, the handle cap $m^2$, is turned to the left for any part of the first 90 degrees, to secure up to the full volume of flow of water, which will be from the service pipe $f$, through the chamber in the casing $c$, to the outlet thereof, through the opening $j'$, and one opening $j^2$, of the valve plug $j$, and to the faucet $a$. This movement causes the worm on the stem $m$, to raise the collar $m^3$, until the ends thereof engaging the stops $k^7$, are raised to a point where they barely engage said stops, thus, failing to close the circuit at this interval. Instantly, however, upon any movement in excess of this 90 degrees the said arms $m^4$, are released and fly through the action of the spring $m^6$, into engagement with the next stops $k^7$, causing the arms $m^5$ to engage those contacts $k^5$ on the same planes with each other. This closes the electrical circuit and energizes the resistance $g$, generating sufficient heat to raise the temperature of the water passing about the casing $h$, and between it and the cylindrical casing $c$. Subsequent movement of the handle $m^2$, through any part of the next 90 degrees will gradually diminish the volume or velocity of the flow of water through the heater, thus retarding its passage therethrough in a manner to increase the duration of the period to which it is subjected to the heat radiated from the resistance $g$, and proportionately raising its temperature. Thus by controlling the velocity of the flow of water or the volume of the water passing through the heater within a given time the temperature may be raised or lowered to the desired extent. When the valve stem has been turned substantially 180 degrees the arms $m^4$, operate as heretofore described and cause the contacts $m^5$,—$k^5$, to disengage each other thus again breaking the circuit and deënergizing the resistance $g$. Owing to the possibility of the excessive heating of the water within the cylinder $c$, through the circuit being closed when the flow of water has entirely ceased, I so set said plug $j$, relative to the contacts $m^5$, that said contacts will be operated slightly in advance of the plug thus causing the electrical circuit to be cut off slightly before the water. This permits the water already heated to pass through the heater after the circuit has been again opened, and avoids the imprisonment of heated water in said heater. In this form of the invention the diametrically opposite ports $j^3$ in the plug $j$, cause said valve to be operated twice during each rotation thereof, thus bringing it into conformity with the usual and well known practice in the construction of electrical switches. The construction of the switch and the operative mechanism heretofore described is intended to exclude water from the switch mechanism and its operation being apparent a description thereof will not be further entered into.

The spiral or helical partition $i$, serves merely to form a more extended course for the water passing through the casing $c$, thus tending to minimize the space required for the heater. If desired the heater $h$, and casing $c$, may be increased in length sufficiently to bring the water into contact with the former for a sufficient interval to bring it to the desired temperature.

The operation of the modification in Figs. 4 and 5 differs from that of the preferred form merely in those respects occasioned by the variance in construction of the valve $p$, and the resultant change in the means actuating the electrical switch. In this form of the invention the handle $n$, must be turned 180 degrees before the full volume of water or "full cold" is attained. This action of the valve stem, it will be observed gives but 90 degrees turn to the stem of the switch, thus causing a full flow of water just prior to the closing of the circuit. Subsequent movement of the handle $n$, for any part of the following 180 degrees will gradually diminish the volume or velocity of the flow of water and will turn the switch stem but 90 degrees, or a fraction thereof, causing the circuit to be closed during this interval and to open just prior to the total cut off of the water, as described in connection with the preferred form of the invention.

The essential characteristics of the invention are the regulation of the temperature of water through the control of the velocity of the flow, or the volume of water passing through a heater giving forth a substantially uniform number of heat units, and the actuation of the electrical switch mechanism substantially simultaneously with the initial operation of the mechanism diminishing such velocity or volume. By this construction, I provide a heater wherein water may be brought substantially instantaneously to the desired temperature, ranging from cold to very hot. This attachment avoids the labor and expense of the double pipe through a building, and the inconvenience due to the limited capacity of the ordinary water back and boiler.

It is not my intention to limit the invention to the precise details of construction heretofore described, it being apparent that such may be varied without departing from the spirit and scope of the invention.

Having described the invention, what I claim as new and desire to have protected by Letters Patent is:—

1. In a hot water heater, the combination with a water faucet and a valve therefor, of a heater, a casing forming a channel adjacent thereto through which the water flows to said valve, a house or service pipe discharging into said casing, means whereby said heater may be made operative or inoperative as desired, and connections between said means and said valve whereby the volume of water flowing through said chamber may be diminished while said heater is operative.

2. In a hot water heater, the combination with a water faucet and a valve therefor, of an electrical heater, a casing forming a channel adjacent thereto through which the water flows to said valve, a house or service pipe discharging into said casing, an electrical switch arranged in the circuit to said heater, and connections between said switch and said valve whereby the volume of water may be diminished while said switch is closed.

3. In a hot water heater, the combination with a water faucet and a valve therefor, of an elongated electrical resistance device, a jacket therefor, a casing surrounding said jacket forming a channel within said casing and communicating with said valve, a house or service pipe discharging into said casing and means controlling the circuit to said resistance device.

4. In a hot water heater, the combination with a water faucet and a valve therefor, of an electrical heater, a casing forming a channel adjacent thereto through which the water flows to said valve, a house or service pipe discharging into said casing, an electrical switch the contacts of which are adapted to alternately open and close the circuit with successive movements of 90 degrees, arranged in the circuit to said heater, and connections between said valve and said switch whereby cold water may be drawn from said casing up to substantially the full volume or velocity of the flow of water while said switch is open, and a varying quantity of water at different temperatures may be drawn from said casing while said switch is closed.

5. In a hot water heater, the combination with a water faucet and a valve therefor, of an elongated electrical resistance device, a jacket therefor, a casing surrounding said jacket forming a channel within said casing about said jacket, and communicating with said valve, a house or service pipe discharging into said casing, a spiral partition extending upwardly between said jacket and said casing, and means actuated through the movement of said valve controlling the circuit to said resistance device.

6. In a hot water heater, the combination with a water faucet and a valve therefor, of an elongated electrical resistance device, a jacket therefor, a casing surrounding said jacket forming a channel within said casing about said jacket, and communicating with said valve, a house or service pipe discharging into said casing, an electrical switch the contacts of which are adapted to alternately open and close the circuit to said resistance device with successive movements of 90 degrees, and connections between said valve and said switch whereby cold water may be drawn from said casing up to substantially the full volume or velocity of the flow of water, while said switch is open, and a varying quantity of water at differing temperatures may be drawn from said casing while said switch is closed.

7. In a hot water heater, the combination with a water faucet and a valve therefor, of an elongated electrical resistance device, a jacket therefor, a casing surrounding said jacket and forming a channel about said jacket communicating with said valve, a house or service pipe discharging into said casing, an electrical switch, the contacts of which are adapted to alternately open and close the circuit to said resistance device with successive movements of 90 degrees, and connections between said valve and said switch whereby cold water may be drawn from said casing up to substantially the full volume or velocity of the flow of water while said switch is open and a varying quantity of water at differing temperatures may be drawn from said casing while said switch is open, and said valve, said contacts and said switch being so set that said circuit will be opened prior to the closing of said valve.

8. In a hot water heater, the combination with a water faucet, and a valve therefor, of an electrical heater, a casing forming a channel adjacent thereto through which the water flows to said valve, a house or service pipe discharging into said casing, a support adjacent to said faucet, an electrical switch mechanism supported thereby, a stem common to said valve and said switch mechanism, and a cap secured to said stem and inclosing said mechanism.

9. In a hot water heater, the combination with a water faucet and a valve therefor, of an electrical heater, a casing forming a channel adjacent thereto through which the water flows to said valve, a house or service pipe discharging into said casing, a semi-circular support adjacent to said faucet, an electrical switch mechanism supported thereby, a stem common to said valve and said switch mechanism, a cup carried by said stem within said support, a cap secured to said stem inclosing said mechanism and said support, and packing between said support and said cup, and said cap, whereby water is excluded from said switch mechanism.

In witness whereof, I have hereunto affixed my signature, this 18th day of March, 1907, in the presence of two witnesses.

GEORGE L. BENNETT.

Witnesses:
WILLIAM NELSON,
E. A. LINNELL.